(12) United States Patent
Lim

(10) Patent No.: US 10,417,640 B2
(45) Date of Patent: Sep. 17, 2019

(54) SYSTEMS AND METHODS TO PROVIDE DATA COMMUNICATION CHANNELS FOR USER INPUTS TO A CENTRALIZED SYSTEM

(71) Applicant: Visa International Service Association, San Francisco, CA (US)

(72) Inventor: Kwang Hyun Lim, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 869 days.

(21) Appl. No.: 15/051,281

(22) Filed: Feb. 23, 2016

(65) Prior Publication Data

US 2016/0247154 A1 Aug. 25, 2016

Related U.S. Application Data

(60) Provisional application No. 62/119,486, filed on Feb. 23, 2015.

(51) Int. Cl.

| G06Q 40/00 | (2012.01) |
| G07D 11/00 | (2019.01) |
| G07F 19/00 | (2006.01) |
| G06F 17/00 | (2019.01) |
| G06Q 20/40 | (2012.01) |
| G06Q 20/32 | (2012.01) |

(52) U.S. Cl.
CPC ......... *G06Q 20/405* (2013.01); *G06Q 20/322* (2013.01); *G06Q 20/401* (2013.01)

(58) Field of Classification Search
USPC ................................. 235/375, 379, 381, 380
See application file for complete search history.

(56) References Cited

U.S. PATENT DOCUMENTS

2016/0110381 A1\* 4/2016 Chen ...................... G06F 16/29
707/609
2016/0210602 A1\* 7/2016 Siddique ............ G06Q 20/0453

\* cited by examiner

*Primary Examiner* — Tuyen K Vo
(74) *Attorney, Agent, or Firm* — The Webb Law Firm

(57) ABSTRACT

An interactive system configured to interact with users in response to user inputs provided to the system, where the users are instructed to provide the inputs by causing communications in an existing network with the user inputs embedded in the communications, a computing device coupled with the network is configured to monitor communications in the network to identify the user input in the communications, and transmit data representing the user input to the interactive system. The operations and communications in the existing network are performed with the interactive system; and the communications containing the user inputs are identified via the computing device for addition use in the interactive system.

20 Claims, 6 Drawing Sheets date of Prov. U.S. Pat. App. Ser. No. 62/119,486, filed Feb. 23, 2015 and entitled "Systems and Methods to Provide Data Communication Channels for User Inputs to a Centralized System," the entire disclosure of which is hereby incorporated herein by reference.

SYSTEMS AND METHODS TO PROVIDE DATA COMMUNICATION CHANNELS FOR USER INPUTS TO A CENTRALIZED SYSTEM

RELATED APPLICATIONS

The present application claims the benefit of the filing date of Prov. U.S. Pat. App. Ser. No. 62/119,486, filed Feb. 23, 2015 and entitled "Systems and Methods to Provide Data Communication Channels for User Inputs to a Centralized System," the entire disclosure of which is hereby incorporated herein by reference.

FIELD OF THE TECHNOLOGY

At least some embodiments disclosed herein relate to techniques to provide data communication channels to receive user inputs.

BACKGROUND

There are many existing data communication channels for users to provide inputs to a centralized location. For example, an Internet based game can be hosted on a centralized location and driven by inputs from users received via the Internet and/or other communication channels.

For example, an interactive voice response system can be connected to a telephone system to receive user inputs via telephones.

For example, a web server connected to the Internet may receive user inputs from user computers via a web interface.

For example, a short code can be set up to receive Short Message Service (SMS) and/or Multimedia Messaging Service (MMS) from users of mobile phones via telecommunication carries.

For example, a mobile application can be installed in users of mobile phones, cellular phones, smartphones, portable media players, and/or tablet computers to receive user inputs and transmit the user inputs to a server for processing.

Gamification has been used for marketing, customer retention, and academic advances and to generate revenue. Foursquare is an example where a user can earn badges by checking-in at retailers and, in turn, earn discounts at retailers. Foldit is a game where participants compete to solve protein structures to find the most efficient ones; and in turn, the game helps scientist develop medical advances and other benefits.

There are alternate reality games (e.g., "I Love Bees") where the game itself is played out in the real world. Participants receive faxes, phone calls, must travel, solve puzzles and accomplish various tasks to play the game. Wikipedia has webpages (e.g., en.wikipedia.org/wiki/I_Love_Bees and en.wikipedia.org/wiki/Alternate_reality_game) describing alternate reality games, such as "I Love Bees".

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
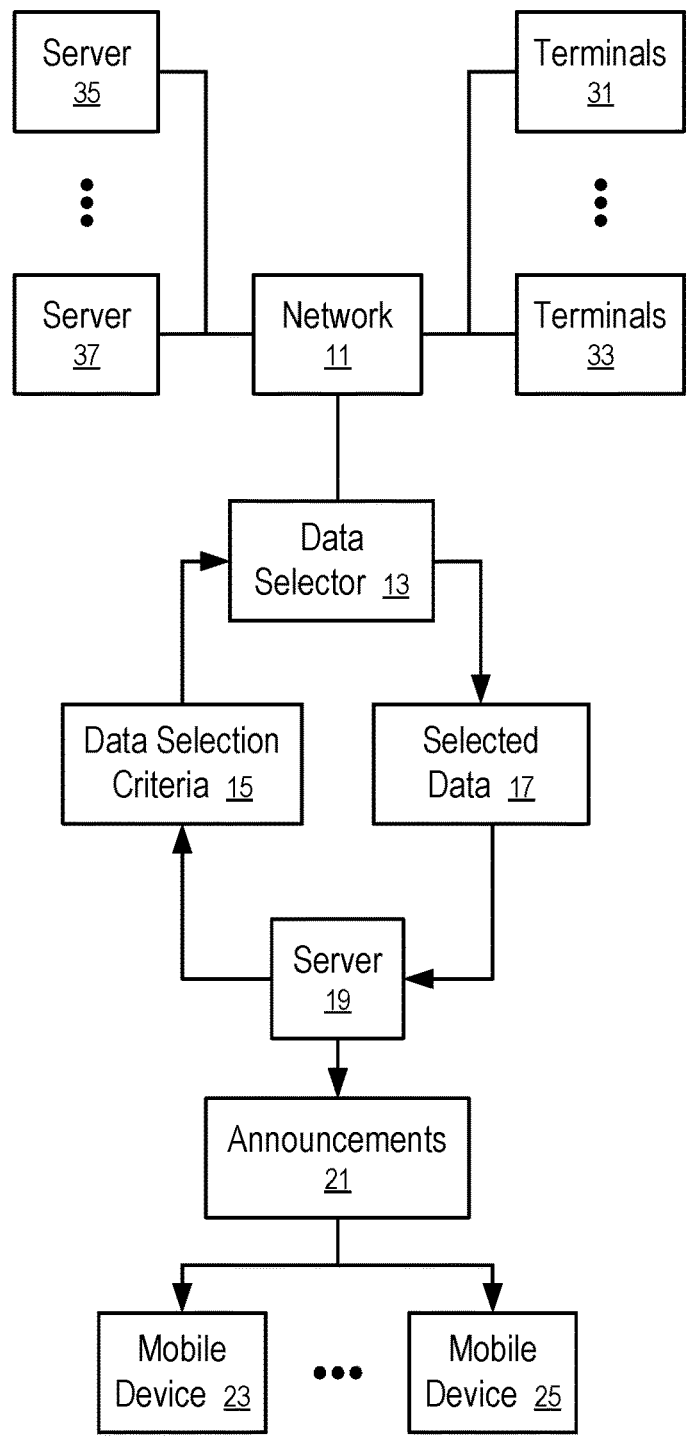
FIG. 1 shows a system having a user input channel for a centralized server according to one embodiment.

FIG. 1 shows a system having a user input channel for a centralized server according to one embodiment.

In FIG. 1, a network (11) connects terminals (31, . . . , 33) and servers (35, . . . , 37) for one or more predetermined functions that are performed in the network (11) in a way independent from the operations of a server (19). The one or more predetermined functions are performed without the server (19).

In FIG. 1, a data selector (13) is coupled with the network (11) to select a portion of the data that is communicated in the network for the one or more predetermined functions and use the selected data (17) as the user input for the server (19) to drive the operations of the server (19), including forming the announcements (21) transmitted to the mobile devices (23, . . . , 25) and identifying the data selection criteria (15) for the subsequent selection of data from the network (11). The selection of the data is performed in accordance with the data selection criteria (15) specified by the server (19). Thus, the selected data (17), which is primarily used in the network (11) for the one or more predetermined functions that are performed without the involvement of the server (19), is additionally used in the server (19) as user input to drive separate operations of the server (19) outside the network (11).

In FIG. 1, the network (11) of the terminals (31, . . . , 33) and servers (35, . . . , 37) functions as a user input device for the server (19); and the announcements (21) to the mobile devices (23, . . . , 25) function as a user output device for the server (19). Instructions configured in the server (19) use the user input device and the user output device to drive user interactions with the server (19).

For example, the server (19) can be configured to run a game interacting with the users of the mobile devices (23, . . . , 25). The network (11) provides a novel and interesting input device to support user interactions in the game.

For example, the network (11) may be an electronic payment processing network that have data controlled at least in part by users interactions with the terminals (31, . . . , 33) to make electronic payments. The server (19) dynamically adjusts the data selection criteria to cause the data selector (13) to filter the data in the network (11) and obtain the selected data (17) that is additionally used as the user input for the server (19); and the announcements are at least partially configured to inform the users to make transactions with the terminals (31, . . . , 33) in certain ways such that the transactions can be captured by the data selector (13) in accordance with the data selection criteria (15). The responses generated by the server (19) in view of the user inputs are provided to the mobile devices (23, . . . , 25) of the users via the announcements (21).

In one embodiment, an electronic payment processing network is used to receive user inputs to drive a game hosted in a centralized system (e.g., server (19)). The user inputs are provided in the form of payment transaction parameters, such as the transaction data generated in the payment transactions initiated in the transaction terminals (e.g., 31, . . . , 33). To obtain the user inputs the server (19) is configured to communicate a set of transaction monitoring parameters (e.g., data selection criteria (15)) to a computing device coupled to the electronic payment processing system, such as the data selector (13) coupled with the network (11). The computing device uses the set of transaction monitoring parameters to detect a subset of payment transactions processed in the electronic payment processing network, identify payment transactions that are selected to generate the user inputs, extract the user inputs that are encoded in the payment transaction records, and communicate the user inputs to the server (19). The user inputs drive the operations of the server (19), which generates announcements (21) as the results and responses to the user inputs, instructions for further user inputs, and generates updated data selection criteria (15) to select data for the extraction of the further user inputs.

Thus, the electronic payment processing network not only processes the payment transactions, but also provides a communication channel to receive user inputs, from users at various locations of the terminals, for the server to drive an activity/operation that is generally separate from payment transactions processed in the electronic payment processing network, such as a game.

For example, the user inputs can be used to run a game configured on the server. For example, an interactive game can be configured as a loyalty reward program in which the user inputs are provided via payment transactions.

For example, a game can be configured around products or services to be marketed. The game prompts the users to provide inputs that are encoded in payment transactions. For example, the user input may be specified via and/or encoded in the transaction location, transaction amount, etc.

For example, the game may prompt the users of the mobile devices (23, . . . , 25) to provide an answer/input in the form of a number that corresponds to the transaction amount of a payment transaction initiated in a pre-registered payment account of a user at one of the transaction terminals. For example, the users may be instructed to provide an input/answer using an identification of a location or merchant of a terminal (31, . . . , or 33) on which a payment transaction in a pre-registered payment account is initiated.

For example, a portal coupled with a transaction handler of an electronic payment processing network is configured in one embodiment to receive requests for user inputs from the game system; and in response, the portal dynamically configures the transaction handler to monitor relevant transactions to extract, in accordance with the request, the user inputs from relevant/qualified payment transactions. The portal then transmits the user inputs to the game system.

A game of one embodiment may offer winners with loyalty rewards, discounts, and/or other benefits. The result of the game may be communicated to the user via social networking sites, mobile applications, RTM (real time messaging), etc. As a result of the system, the payment processing system can be used as a part of a game system that promotes products and services, provides loyalty rewards, and drives payment card transactions.

For example, the game of one embodiment is in the form of a puzzle having a series of questions where the answers can be provided as numbers represented by the transaction amount, locations corresponding POS terminal locations of payment transactions, items being purchased by payment transactions, etc. After the puzzle is broadcast to the users via a media channel, such as a mobile application and/or a social networking site, the transaction handler is configured to detect the transactions that are participants of the game, extract the answers, and provide the inputs received in the game to identify a winner.

In one embodiment, games are created on the server where cardholders of payment cards are instructed to use card payments as the inputs for the games, such as answers to the games questions. The cardholders participate in the games to win rewards that can be used to reduce certain payment transactions made in the payment card processing network when the payment transactions meet a set of predetermined requirements. The games will drive cardholders to use their payment cards more and will generate more awareness of the products and services being marketed via the games.

In general, there is a tremendous amount of payment data that is communicated through the electronic payment processing network from the transaction terminals of the merchants to acquirer processors that control merchant accounts to receive payments, communicated via a transaction handler of the electronic payment processing network interconnecting the acquirer processors and issuer processors that control consumer accounts to make payments.

In one embodiment, the payment data is used in real-time to create and/or support a game. The game may be open to anyone who has a payment account controlled by any issuer processor in the electronic payment processing network, or can be limited to a certain group (e.g. payment accounts controlled by a specific issuer processor). In some embodiments, the participants are required to enroll in the game by identifying their payment accounts such that the monitoring of the transaction data to extract the user input can be limited to the transactions made in the registered payment accounts. Further, the selection criteria for the user input can be limited to a predetermined time window to minimize the computation burden of the monitoring of the transaction and the extraction of the user input data on the electronic payment processing network.

For example, when a game is in a form of a puzzle having a series of questions, the answers can be configured to be received from the payment data generated by the cardholder/account-holder after making a purchase during a predetermined time window. Transactions made outside the time window are invalid user inputs. Thus, the monitoring can be limited to the transactions initiated with the time window. The game prompts the user to answer to the question by where and/or how much payments are made for purchases. The game may reward the winning cardholder who provides the correct answer to the question. The rewards may be provided in the form of a statement credit to the account used to make the payment that provides the winning answer, a discount offer applicable to a subsequent payment transaction of the user, an amount of cash price, a specific product shipped to the address of a winning user, a service offered to the winner, etc.

For example, to create a viral effect, a question in the game is broadcast live on social media to everyone who is participating in the puzzle. Cardholders can track the progress of the puzzles by using a social media app such as a Facebook profile. Each question answered correctly will be posted with the name of the user so that cardholders can continue onto the next question. This will continue until all of the questions in the puzzle are answered and the final prize is rewarded.

As one example a movie studio wants to market a latest movie using a game according to one embodiment. The issuing bank and the movie studio create a puzzle with a series of questions that can be answered by using the payment cards/accounts issued by the issuing bank. The puzzle is marketed on various mediums.

A cardholder, Bob, registers with a portal (e.g., of the movie studio, the issuer, or the transaction handler) his payment card to participate in this movie puzzle. The portal stores the information related to the puzzle (e.g. the answers). Bob will log in to the social networking site at this marketing launch time and find the first question. The first question may states "How tall is xyz in meters?" The answer to that question is 1.88 meters. Bob guesses that the answer is 1.88 meters; he purchases a product that is worth $1.88 and makes a payment for the $1.88 purchase using his registered payment card.

Since Bob registered his payment card and the question was broadcast on the social networking site, the portal communicates to the transaction handler to monitor the transactions in his card to detect a transaction in the amount of $1.88. Upon detecting of the payment of $1.88 made using the registered card of Bob, the system declares that Bob answered the first question correctly.

Thus, when Bob checks the social networking site later, he sees that his user name has been posted as a person who answered the first question correctly. He is rewarded a movie set souvenir.

A second question is then posted on the social networking site where the answer to the question may involve purchasing a specific product, the geolocation of the merchant, date and time, etc. Any characteristics and/or combinations of the data fields in the transaction message (e.g., ISO message) can be used to transmit the answer to a question.

In variations of the game, multiple issuing banks can participate. In some embodiments, the game may be limited to payment transactions with specific merchants. Rewards can be awarded to the first person to answer correctly or the first x number of persons to answer correctly.

Different products can be marketed such as a new soft drink or a new phone smartphone. The questions may be related to the marketed products. Alternatively or in combination, the rewards may be related to the marketed products. For example, a reward may be a discount for the purchase of the marketed products, or a free supply of the marketed products. The payment transactions eligible for the game may be made via online payment on the web, mobile payments, swipe a payment card at the transaction terminal, etc.

In one embodiment, the social media feature may be omitted and the puzzle played just with single individuals. For example, Bob may get questions via text message each time he answers a question correctly.

The answers to the questions may be played out globally. For instance, the puzzle may be structured in a way that the cooperation of many individuals is needed to advance to the next stage of the puzzle. For example, a question may state "where was the first xyz drink sold?" Participants may coordinate with each other on social media to determine the answer and try to have a participant purchase the xyz drink in the specific town.

To use social networks for real-time updates, coordination is implemented among the transaction handler, the issuer, and/or the social networking site. Depending on participation between these players, a database containing the answers will be stored and/or accessed. Once a question is answered correctly, the transaction handler or the issuer will update the social network with the latest progress. The transaction message may also be enhanced to include geo-location, products purchased, etc. to allow more feature-rich questions.

As another example, a game is configured to promote a new payment method. For example, to promote the adoption of a new payment method (e.g., a mobile payment method) by consumers and merchants, a game can be created by participating merchants and the transaction handler. The game is advertised on various sources and social media: Use the xyz payment method at any participating merchants that accept the xyz payment method such as at store K and store Q and win prizes. Sign up to participate by liking us at social networking site S or follow us on social networking site T." A series of questions/challenges will be posted on social media websites where the participants are to use the xyz payment method.

An example of a first question/challenge states "the first 500 people to make a purchase at a stored K on May 3, 2015 will receive a $5 gift card."

A second question/challenge states "do you own a card registered with xyz payment method with a card number that ends in 9? Make any purchase with the xyz payment method on May 5, 2015 and receive another $5 gift card."

A third question/challenge states "answer this question by making a purchase from a specific merchant. The merchant's name is the answer to this question. This merchant opened its first store in Chicago in 1901."

In one embodiment, the game can also be tailored so that the social media participation can be cooperative and can allow global participation. Participants can help each other and share answers to particularly difficult questions or challenges so that the game can proceed to the next level. For example, if the answer to a challenge is to make a purchase at a merchant in Myanmar, a small country in Southeast Asia, participants can post the answer and ask people who live there or who can travel there to make a purchase from there.

For example, as the game progresses from one question to another, the participants of the game may dynamically join each other to form teams. The competition is among the evolving teams to score the highest game points in the game, where each winning answer earns the respective team a predetermined amount of game points.

In one embodiment, the rewards can be tailored, e.g., earn reward points, coupons, etc.

Because the answer can be submitted using all forms of payment, online payments offers greater flexibility if the e-Commerce website is enhanced. For instance, the checkout page on an e-Commerce website may contain a text box where the answer may be submitted with the purchase. The answer is included in the authorization request messages for transmission in the electronic payment processing network; and the transaction handler is configured to detect the answer embedded in the authorization request messages and extract the answer for the server of the game.

Another form of payment can be P2P payments which also can be used. For instance, a challenge may ask participants to split a bill in a restaurant by paying their friends their share of the bill using P2P payments.

In one embodiment, games are created where cardholders can use card purchases as the input to provide answers to the games questions to win rewards. This will drive cardholders to use their cards more and will generate more awareness of the products and services being marketed.P-40821 US FIG. 2 shows a system configured to provide data communication channels according to one embodiment.

Figure 2:
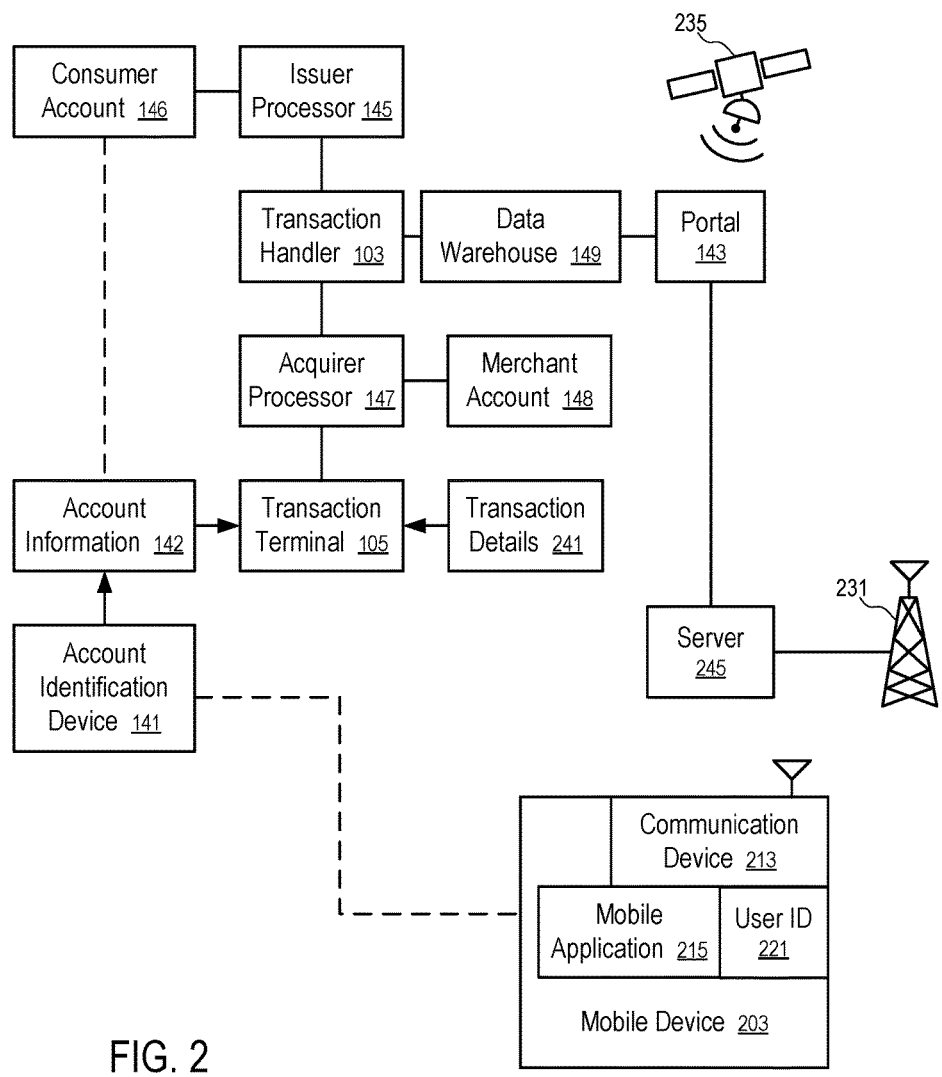
FIG. 2 shows a system configured to provide data communication channels according to one embodiment.

The system in FIG. 2 includes a server (245) configured to run a game by receiving user input via an electronic payment processing network and by providing instructions and outputs via announcements (21) to user devices, such as a mobile device (203). The announcements (21) are communicated at least in part via a communication network that can broadcast messages to the user devices (e.g., 203) separately from the electronic payment processing network, such as a cellular communication network having base stations (e.g., (231), and/or a satellite communication system having satellites (e.g., 235).

In FIG. 2, the electronic payment processing network includes a transaction handler (103) that connects at least one issuer processor (145) controlling consumer accounts (e.g., 146) from which payment transactions are made using account information (142) presented by account identification devices (e.g., 141) at the transaction terminals (e.g., 105), and at least one acquirer processor (147) controlling merchant account (148) in which the payments are received in the electronic payment processing network.

In FIG. 2, the server (245) is configured to receive user inputs at least in part via the portal (143) coupled with the transaction handler (103) of the electronic payment processing network. Alternatively, a portal (143) coupled with other components of the electronic payment processing network, such as the issuer processor (145) or the acquirer processor (147), can be used to provide the user inputs in a similar way.

For example, the server (245) is configured in one embodiment to broadcast messages to the user devices, such as the mobile device (203), a smart phone, a tablet computer, a media player, a personal computer. The mobile device (203) includes a communication device (213) to receive messages from the server (245) via a base station (231) of a cellular communication network, or a satellite (235).

For example, the mobile device (203) of one embodiment includes a mobile application (215) having a user ID (221) that identifies the user of the mobile device (203). The mobile application (215) of one embodiment is configured to communicate with the portal (143) to register the consumer account (146) of the user and thus activate the use of the transaction handler (103) as a communication channel to provide user inputs to the server (245). After the registration, the transaction handler monitors the transactions made using the account information (142) of the consumer account to extract user inputs for the server (245) and provide the extracted user input to the server (245).

In one embodiment, when the server (245) is expecting a user input from the mobile device (203), the server (245) communicates a request to the portal (143). The request identifies the consumer account (146) (e.g., via the user ID (221)). The request may further identifies a set of requirements formulated based on data transmitted via the payment processing messages transmitted through the transaction handler, such as the date and time of a payment transaction, a transaction amount, an attribute of a merchant of the transaction terminal (105) on which the payment transaction is initiated, such as the cite and/or the street address of the merchant, etc. The requirements represent the data selection criteria (15) and are used to instruct the portal (143) and/or the transaction handler (103) to generate the user input data from the parameters in the payment processing messages.

In response to the request from the server (245), the portal (143) is configured to generate a trigger record and provide the trigger record in the data warehouse (149). The trigger record instructs the transaction handler (103) to monitor the transactions processed by the transaction handler (103) and detect a payment transaction that meets the requirement of the request received from the server (245).

For example, when the user of the mobile device (203) is ready to provide a user input, the user uses the account identification device (141) to present to the transaction terminal (105) the account information (142) that identifies the consumer account (146) to make a payment for a purchase. The user selects the payment in a way such that a payment transaction message transmitted in the electronic payment processing network includes one or more data fields (e.g., transaction date and time, transaction amount, the location of the payment transaction, an item purchase via the payment transaction) that represent the user input.

The transaction terminal (105) generates an authorization request message for the payment transaction, transmits the authorization request message according to a communication protocol of the electronic payment processing network to the issuer processor (145), via the acquirer processor (147) that controls the merchant account (148) to receive the payment for the merchant, and via the transaction handler (103) that interconnects the acquirer processors (e.g., 147) in the electronic payment processing network and the issuer processors (e.g., 145) in the electronic payment processing network. The transaction handler (103) routes the authorization request messages to the issuer processors of the respective consumer accounts used to make the payments, and routes the authorization response messages back to the acquirer processors of the respective merchant accounts used to receive the payments.

In some embodiments, the transaction details (105), such as the identifications of items purchased, the quantities of the items purchased, and/or the unit prices of the items purchased are also transmitted via transaction terminal (105) to the transaction handler (103) and/or the portal (143) as part of data transmitted for the payment transaction.

Based on the trigger records generated by the portal (143), the transaction handler (103) identifies a payment transaction, and provides the data about the payment transaction to the portal (143) via the data warehouse (149). The portal (143) determines if the payment transaction includes data that meet the request from the server (245) (e.g., the data selection criteria (15)); and if so, the portal (143) provides a notification to the server (245) that includes the extracted transaction data that represents the user input.

In one embodiment, the request from the server (245) causes the portal (143) to determine whether a payment transaction meeting a set of requirements has occurred in the consumer account (146); and the notification includes an indication that such a payment transaction has occurred.

In one embodiment, the request from the server (245) cause the portal (143) to determine whether a payment transaction meeting a set of requirements has occurred in the consumer account (146); and the notification includes a data set extracted from payment data and/or the relevant payment messages processed at the transaction handler. The data set may include fields such as date and time of the payment transaction, the transaction amount of the payment transaction, the location of the payment transaction, the identify the merchant operating the transaction terminal (105), an identification of an item purchased via the payment transaction, etc.

In one embodiment, the data selection criteria (15) identify one or more data fields in payment processing messages propagated in the electronic payment processing network.

Once the portal (143) identifies a payment processing message of a transaction that meets the selection requirement (e.g., the transaction is performed using the registered consumer account (146), within a predetermined period of time, and/or having a transaction amount within a predetermined range), the portal (143) extracts the data from the one or more data fields according to the data selection criteria (15) to form a data set and reports the data set to server (245) as an input from the user corresponding to the registered consumer account (146). The server (245) further processes the received data set to run the game. The data selection arrangement reduces the transmission of transaction data between the portal (143) and the server (245) and improves the privacy protection for the users.

In one embodiment, the data selection criteria (15) identify the expected user input and one or more data fields in payment processing messages where the user input is to be found. For example, the data selection criteria (15) of one embodiment identify an expected user input of a particular number (e.g., 1.88) to be specified in the particular data field (e.g., transaction amount). When such a transaction is found in the consumer account (146), the portal (143) provides the notification to the server (245) identifying the user of the consumer account (146) to indicate that the user has provided the expected user input. Such a communication arrangement further reduces the transmission of transaction data between the portal (143) and the server (245) and improves the privacy protection for the users.

FIG. 2 illustrates an example of the use of the portal (143) to provide user input sent via payment data to the server (245). Alternatively, in user input can be extracted in a similar way via a portal coupled with the issuer processor (145) from payment data processed by the issuer processor (145).

FIG. 2 illustrates an electronic payment processing system with a transaction handler connecting an issuer processor (145) and an acquirer processor (147). In general, the electronic payment processing system has more than one issuer processor (145) controlling more than one consumer account (146) and more than one acquirer processor (147) controlling more than one merchant account (148); and more than one terminal (105) is connected to the acquirer processors (e.g., 147).

In some embodiments, the transaction handler (103) is also implemented with the functions of the issuer processors (e.g., 145) and/or the functions of the acquirer processors (e.g., 147). Thus, the disclosure is not limited to a particular form of an electronic payment processing network.

Figure 3:
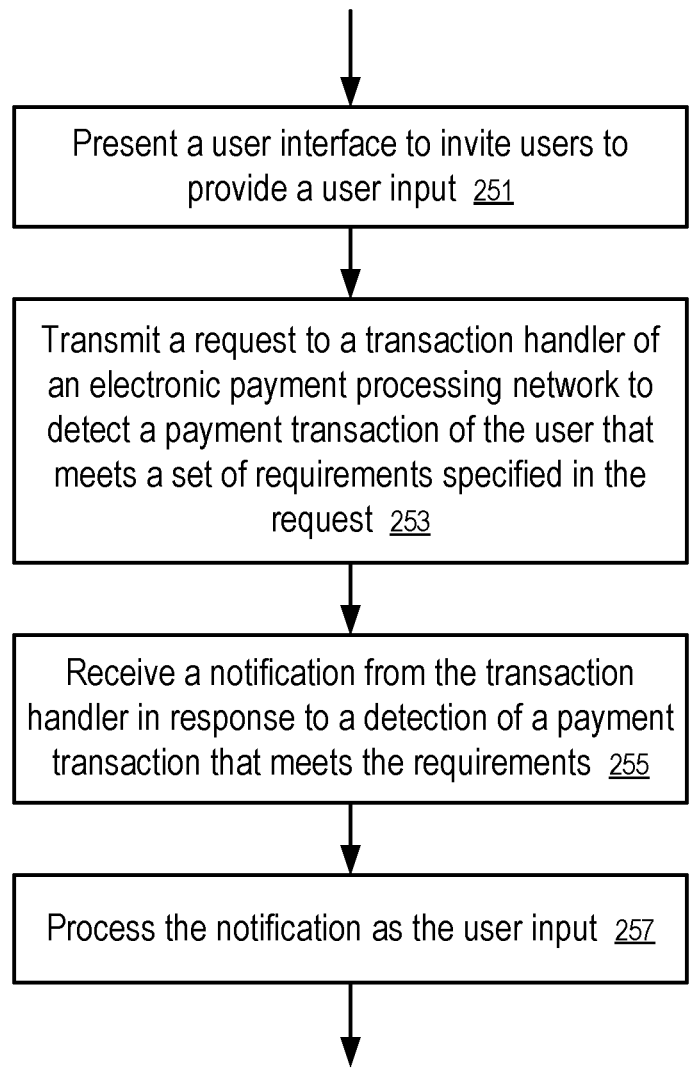
FIG. 3 shows a method to provide data communication channels according to one embodiment.

FIG. 3 shows a method to provide data communication channels according to one embodiment. For example, the method of FIG. 3 can be implemented in the system of FIG. 1 and/or FIG. 2.

In FIG. 3, a computing device is configured, via instructions stored in a memory, to: present (251) a user interface to invite users to provide a user input; transmit (253) a request to a transaction handler of an electronic payment processing network to detect a payment transaction of the user that meets a set of requirements specified in the request; receive (255) a notification from the transaction handler in response to a detection of a payment transaction that meets the requirements; and process (257) the notification as the user input.

In one embodiment, a computing apparatus includes a computing device coupled with a communication network connecting separate computers, including: a plurality of terminals; and a plurality of server computers, wherein the terminals are configured to generate messages transmitted via the network to the server computers. The computing apparatus further includes a game server configured to communicate instructions to devices of users to instruct the users to provide user inputs to the server via: causing the terminals to generate first messages in the communication network; and causing the first messages generated by the terminals to include the user inputs in a way identified in the instructions.

The game server is configured to transmit to the computing device data selection criteria to cause the computing device to: monitor, using the data selection criteria, messages transmitted in the network; detect, using the data selection criteria, the first messages transmitted in the network; extract, in accordance with the data selection criteria, the user inputs from the first messages transmitted in the network; and transmit the user inputs to the game server.

The user inputs cause the game server to: generate an output based on the user inputs; communicate the output to the devices of the users; and update the data selection criteria to receive further inputs via the computing device coupled with the communication network.

For example, the terminals are transaction terminals configured to generate payment transactions using payment accounts; and the communication network includes an electronic payment processing network configured to transmit authorization request messages for the payment transactions.

For example, the user inputs are provided via one or more fields in the authorization request messages; and the data selection criteria identify the one or more fields.

For example, the data selection criteria identify an expected input; and the user inputs transmitted by the computing device to the game server includes an identification of a payment account in which a payment is detected to be authorized via a payment processing message that contains the expected input.

In one embodiment, the computing device is further configured to: extract data from the one or more fields of the payment processing messages according to the data selection criteria; and form data sets from the extracted data, wherein the user inputs are transmitted to the game server via transmission of the data sets.

For example, a game running in the game server requests the user inputs to provide an answer to a question provided in the instructions; and the output identifies a winner who provides the answer correctly in accordance with the instructions using one of the transaction terminals to make a payment transaction.

In general, transaction data, such as records of transactions made via credit accounts, debit accounts, prepaid accounts, bank accounts, stored value accounts and the like, is processed to provide information for various services, such as reporting, benchmarking, advertising, content or offer selection, customization, personalization, prioritization, etc.

For example, an advertising network is provided based on a transaction handler to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers.

In one embodiment of improving privacy protections, users are required to enroll in a service program and provide consent to allow the system to use related transaction data and/or other data for the related services, and the system is configured to provide the services while protecting the privacy of the users in accordance with the enrollment agreement and user consent.

In one embodiment, the information and/or advertisement is identified, generated, selected, prioritized, adjusted, customized, and/or personalized to target the user associated with the transaction, to whom the transaction related information is presented on the point of interaction. In one embodiment, the targeting is based on intelligence information about the user generated at least in part from the transaction data recorded by the transaction handler. For example, the transaction data, and/or the information, such as account data, merchant data, etc. can be used to generate a transaction profile of the user, which is used for the targeting of the information or advertisement.

In one embodiment, a user specific profile is selected or calculated in real time for the user involved in the transaction, to whom the transaction related information is presented on the point of interaction. The user specific profile may describe the customer at varying levels of specificity. Based on the user specific profile, a targeted advertisement is selected, generated, customized, prioritized and/or adjusted in real time for presentation to the customer with the transaction related information, as discussed in more detail below.

In one embodiment, the user specific advertisement data (119) is provided to the transaction terminal (105), via the transaction handler (103) and/or the portal (143), in connection with an authorization request from the transaction terminal (105), such as in examples provided in U.S. Pat. No. 8,606,630, entitled "Systems and Methods to Deliver Targeted Advertisements to Audience", the disclosure of which is hereby incorporated herein by reference.

Figure 4:
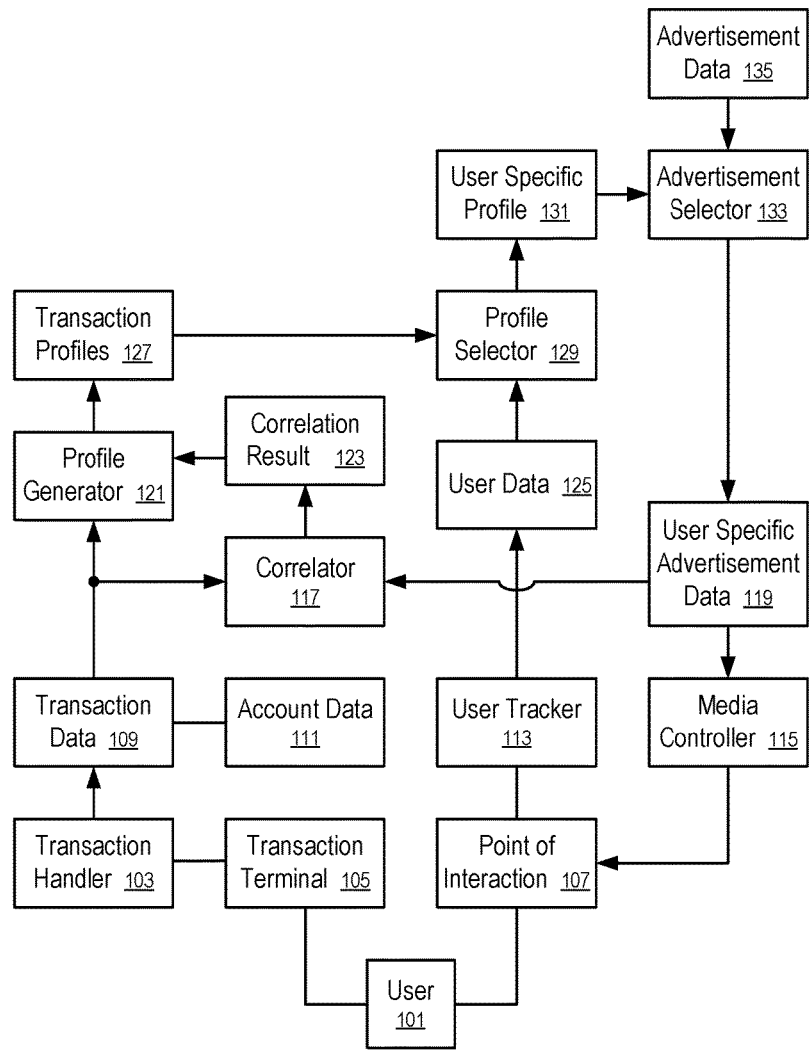
FIG. 4 illustrates a system to provide services based on transaction data according to one embodiment.

FIG. 4 illustrates a system to provide services based on transaction data according to one embodiment. In FIG. 4, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In one embodiment, the system further includes a correlator (117) to correlate user specific advertisement data (119) with transactions resulting from the user specific advertisement data (119). The correlation results (123) can be used by the profile generator (121) to improve the transaction profiles (127).

In one embodiment, the transaction profiles (127) are generated from the transaction data (109). For example, an aggregated spending profile is generated via the factor analysis and cluster analysis to summarize the spending patterns/behaviors reflected in the transaction records.

Figure 5:
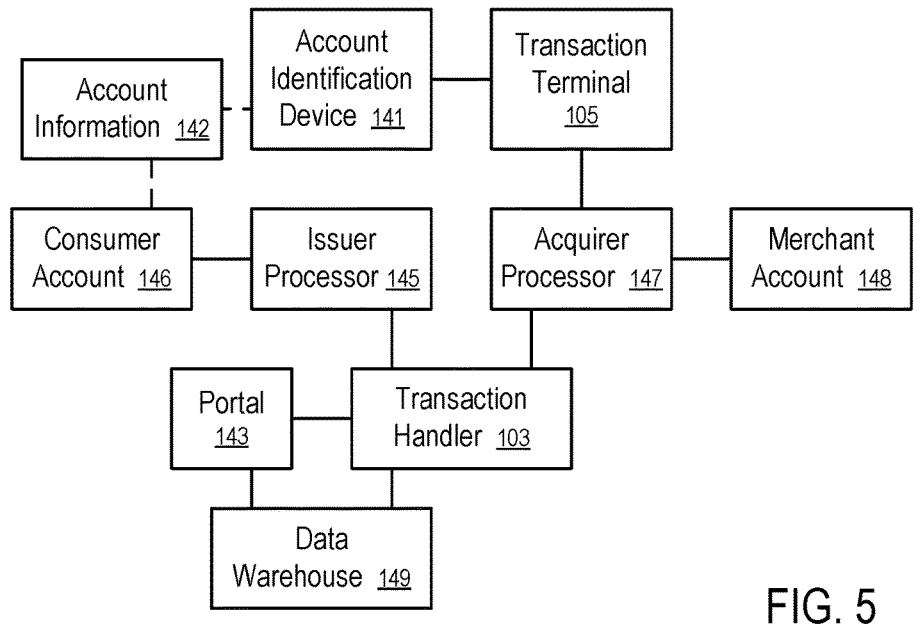
FIG. 5 shows a system to provide information based on transaction data according to one embodiment.

In one embodiment, a data warehouse (149) as illustrated in FIG. 5 is coupled with the transaction handler (103) to store the transaction data (109) and other data, such as account data (111), transaction profiles (127) and correlation results (123). In FIG. 5, a portal (143) is coupled with the data warehouse (149) to provide data or information derived from the transaction data (109), in response to a query request from a third party or as an alert or notification message.

In FIG. 5, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 6:
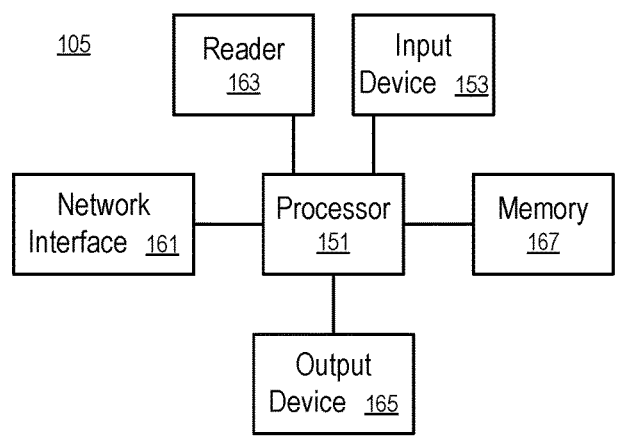
FIG. 6 illustrates a transaction terminal according to one embodiment.
Figure 7:
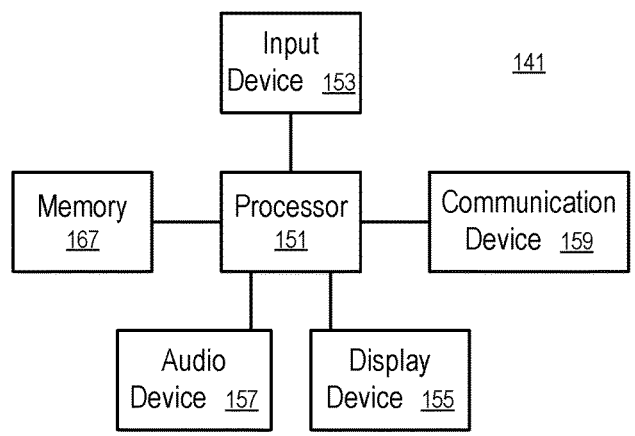
FIG. 7 illustrates an account identifying device according to one embodiment.
Figure 8:
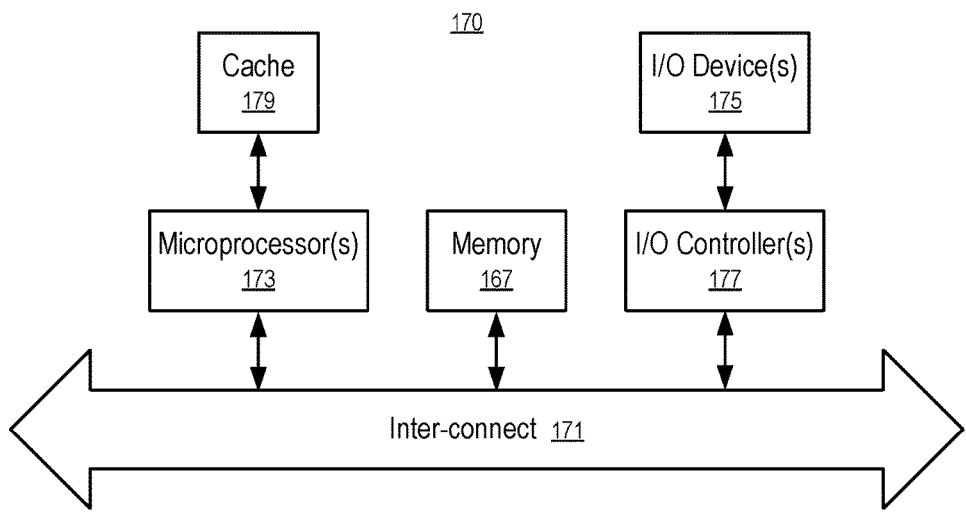
FIG. 8 illustrates a data processing system according to one embodiment.

FIGS. 6 and 7 illustrate examples of transaction terminals (105) and account identification devices (141). FIG. 8 illustrates the structure of a data processing system that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated in the drawings.

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

In one embodiment, the transaction handler (103) maintains a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section.

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In FIG. 4, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. Pat. Pub. No. 2011/0054981, "Analyzing Local Non-Transactional Data with Transactional Data in Predictive Models," the disclosure of which is hereby incorporated herein by reference.

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

In one embodiment, the profile generator (121) generates and updates the transaction profiles (127) in batch mode periodically. In other embodiments, the profile generator (121) generates the transaction profiles (127) in real time, or just in time, in response to a request received in the portal (143) for such profiles.

Further details and examples about the transaction profiles (127) in one embodiment are provided in U.S. Pat. App. Pub. No. 2010/0306029, entitled "Cardholder Clusters" and "U.S. Pat. App. Pub. No. 2010/0306032, entitled "Systems and Methods to Summarize Transaction Data", the entire disclosures of which applications are hereby incorporated herein by reference.

In FIG. 4, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

Further details about targeted offer delivery in one embodiment are provided in U.S. Pat. App. Pub. No. 2010/0030644, entitled "Targeted Advertising by Payment Processor History of Cashless Acquired Merchant Transaction on Issued Consumer Account," and in U.S. Pat. App. Pub. No. 2011/0035280, entitled "Systems and Methods for Targeted Advertisement Delivery", the disclosures of which applications are hereby incorporated herein by reference.

In FIG. 4, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) that is for a particular user or a group of users and that best matches the set of characteristics specified by the user data (125).

In one embodiment, the transaction handler (103) uses the account data (111) to store information for third party loyalty programs. The transaction handler (103) processes payment transactions made via financial transaction cards, such as credit cards, debit cards, banking cards, etc.; and the financial transaction cards can be used as loyalty cards for the respective third party loyalty programs. Since the third party loyalty programs are hosted on the transaction handler (103), the consumers do not have to carry multiple, separate loyalty cards (e.g., one for each merchant that offers a loyalty program); and the merchants do not have to spend a large setup and investment fee to establish the loyalty program. The loyalty programs hosted on the transaction handler (103) can provide flexible awards for consumers, retailers, manufacturers, issuers, and other types of business entities involved in the loyalty programs. The integration of the loyalty programs into the accounts of the customers on the transaction handler (103) allows new offerings, such as merchant cross-offerings or bundling of loyalty offerings. Some examples of such loyalty programs are provided in U.S. Pat. Pub. No. 2011/0087530, entitled "Systems and Methods to Provide Loyalty Programs", the entire disclosure of which is hereby incorporated herein by reference.

In one embodiment, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

In one embodiment, the SKU level purchase details are requested from the merchants or retailers via authorization responses (e.g., as illustrated in U.S. Pat. App. Pub. No. 2011/0093335, entitled "Systems and Methods for Advertising Services Based on an SKU-Level Profile", and U.S. Pat. App. Pub. No. 2011-0288918, entitled "Systems and Methods for Redemption of Offers", the entire disclosures of which applications are hereby incorporated herein by reference), when the account (146) of the user (101) is enrolled in a program that allows the transaction handler (103) (and/or the issuer processor (145)) to collect the purchase details.

In one embodiment, based on the SKU information and perhaps other transaction data, the profile generator (121) may create an SKU-level transaction profile for the user (101). In one embodiment, based on the SKU information associated with the transactions for each person entering into transactions with the operator of the transaction handler (103), the profile generator (121) may create an SKU-level transaction profile for each person.

For example, in one embodiment, the transaction handler (103) is configured for the redemption of manufacturer coupons via statement credits. Manufacturers may provide users (e.g., 101) with promotional offers, such as coupons for rebate, discounts, cash back, reward points, gifts, etc. The offers can be provided to users (e.g., 101) via various channels, such as websites, newspapers, direct mail, targeted advertisements (e.g., 119), loyalty programs, etc.

In one embodiment, when the user (101) has one or more offers pending under the consumer account (146) and uses the consumer account (146) to pay for purchases made from a retailer that supports the redemption of the offers, the transaction handler (103) is to use authorization responses to request purchase details, match offer details against the items shown to be purchased in the purchase details to identify a redeemable offer, and manage the funding for the fulfillment of the redeemable offer between the user (101) and the manufacturer that funded the corresponding offer. In one embodiment, the request for purchase details is provided in real time with the authorization message; and the exchange of the purchase details and matching may occur real-time outside the authorization process, or at the end of the day via a batch file for multiple transactions.

In one embodiment, the offers are associated with the consumer account (146) of the user (101) to automate the processing of the redemption of the offers. If the user (101) makes a payment for a purchase using the consumer account (146) of the user (101), the transaction handler (103) (and/or the issuer processor (145)) processes the payment transaction and automatically identifies the offers that are qualified for redemption in view of the purchase and provides the benefit of the qualified offers to the user (101). In one embodiment, the transaction handler (103) (or the issuer processor (145)) is to detect the applicable offer for redemption and provide the benefit of the redeemed offer via statement credits, without having to request the user (101) to perform additional tasks.

In one embodiment, once the user (101) makes the required purchase according to the requirement of the offer using the consumer account (146), the benefit of the offer is fulfilled via the transaction handler (103) (or the issuer processor (145)) without the user (101) having to do anything special at and/or after the time of checkout, other than paying with the consumer account (146) of the user (101), such as a credit card account, a debit card account, a loyalty card account, a private label card account, a coupon card account, or a prepaid card account that is enrolled in the program for the automation of offer redemption.

In one embodiment, the redemption of an offer (e.g., a manufacturer coupon) requires the purchase of a specific product or service. The user (101) is eligible for the benefit of the offer after the purchase of the specific product or service is verified. In one embodiment, the transaction handler (103) (or the issuer processor (145)) dynamically requests the purchase details via authorization response to determine the eligibility of a purchase for the redemption of such an offer.

In one embodiment, the methods to request purchase details on demand via (or in connection with) the authorization process are used in other situations where the transaction level data is needed on a case-by-case basis as determined by the transaction handler (103).

Further details and examples of one embodiment of offer fulfillment are provided in U.S. Pat. App. Pub. No. 2011/0288918, entitled "Systems and Methods for Redemption of Offers," the disclosure of which is hereby incorporated herein by reference.

FIG. 5 shows a system to provide information based on transaction data (109) according to one embodiment. In FIG. 5, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records, such as the transaction profiles (127) or aggregated spending profile. The portal (143) may be implemented as a web portal, a telephone gateway, a file/data server, etc.

In FIG. 5, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

In one embodiment, the account identification device (141) is a plastic card having a magnetic strip storing account information (142) identifying the consumer account (146) and/or the issuer processor (145). Alternatively, the account identification device (141) is a smartcard having an integrated circuit chip storing at least the account information (142). In one embodiment, the account identification device (141) includes a mobile phone having an integrated smartcard.

In one embodiment, the account information (142) is printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

In one embodiment, the transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

In one embodiment, the transaction handler (103), the issuer processor (145), and the acquirer processor (147) may each include a subsystem to identify the risk in the transaction and may reject the transaction based on the risk assessment.

In one embodiment, the account identification device (141) includes security features to prevent unauthorized uses of the consumer account (146), such as a logo to show the authenticity of the account identification device (141), encryption to protect the account information (142), etc.

In one embodiment, the transaction terminal (105) is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In one embodiment, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. In one embodiment, dedicated communication channels are used between the transaction handler (103) and the issuer processor (145), between the transaction handler (103) and the acquirer processor (147), and/or between the portal (143) and the transaction handler (103).

In one embodiment, the transaction handler (103) uses the data warehouse (149) to store the records about the transactions, such as the transaction records or transaction data (109). In one embodiment, the transaction handler (103) includes a powerful computer, or cluster of computers functioning as a unit, controlled by instructions stored on a computer readable medium.

In one embodiment, the transaction handler (103) is configured to support and deliver authorization services, exception file services, and clearing and settlement services. In one embodiment, the transaction handler (103) has a subsystem to process authorization requests and another subsystem to perform clearing and settlement services.

In one embodiment, the transaction handler (103) is configured to process different types of transactions, such credit card transactions, debit card transactions, prepaid card transactions, and other types of commercial transactions.

In one embodiment, the transaction handler (103) facilitates the communications between the issuer processor (145) and the acquirer processor (147).

In one embodiment, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In one embodiment, the issuer processor (145) is to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. In one embodiment, the funds are transferred electronically.

In one embodiment, the transaction terminal (105) may submit a transaction directly for settlement, without having to separately submit an authorization request.

FIG. 6 illustrates a transaction terminal according to one embodiment. In FIG. 6, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 6. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 6. For example, in one embodiment, the transaction terminal (105) is an ATM machine, which includes components to dispense cash under certain conditions.

FIG. 7 illustrates an account identifying device according to one embodiment. In FIG. 7, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 7, such as a cellular communications subsystem.

In one embodiment, the communication device (159) may access the account information (142) stored on the memory (167) without going through the processor (151).

In one embodiment, the account identification device (141) has fewer components than those illustrated in FIG. 7. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

In one embodiment, the transaction handler (103) is a payment processing system, or a payment card processor, such as a card processor for credit cards, debit cards, etc.

FIG. 8 illustrates a data processing system according to one embodiment. While FIG. 8 illustrates various components of a computer system, it is not intended to represent any particular architecture or manner of interconnecting the components. One embodiment may use other systems that have fewer or more components than those shown in FIG. 8.

In FIG. 8, the data processing system (170) includes an inter-connect (171) (e.g., bus and system core logic), which interconnects a microprocessor(s) (173) and memory (167). The microprocessor (173) is coupled to cache memory (179) in the example of FIG. 8.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

OTHER ASPECTS

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The entire disclosures of the patent documents discussed above are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system for detecting an expected input during a game, comprising:
   a computing device coupled with a communication network connecting separate computers, including
     a plurality of terminals; and
     a plurality of server computers, wherein the plurality of terminals are configured to generate messages transmitted via the network to the plurality of server computers; and
   a game server configured to communicate instructions to devices of users to instruct the users to provide user inputs to the server via a terminal from among the plurality of terminals, wherein the user inputs received via the terminal:
     cause the terminals to generate first messages in the communication network; and
     cause the first messages generated by the terminals to include the user inputs in a way identified in the instructions;
   wherein the game server is configured to transmit data selection criteria to the computing device to cause the computing device to:
     monitor, using the data selection criteria, messages transmitted in the communication network;
     detect, using the data selection criteria, the first messages transmitted in the communication network;
     extract, in accordance with the data selection criteria, the user inputs from the first messages transmitted in the communication network; and
     transmit the user inputs extracted in accordance with the data selection criteria to the game server,
   wherein the user inputs cause the game server to:
     generate an output to be displayed via devices of the users based on the user inputs;
     communicate the output to the devices of the users; and
     update the data selection criteria to receive further inputs via the computing device coupled with the communication network.

2. The system of claim 1, wherein the terminals are transaction terminals configured to generate payment transactions using payment accounts; and
   the communication network includes an electronic payment processing network configured to transmit authorization request messages for the payment transactions.

3. The system of claim 2, wherein the user inputs are provided via one or more fields in the authorization request messages; and
   the data selection criteria identifies the one or more fields.

4. The system of claim 3, wherein the data selection criteria identify an expected input; and
   the user inputs transmitted by the computing device to the game server includes an identification of a payment account in which a payment is detected to be authorized via a payment processing message that contains the expected input.

5. The system of claim 3, wherein the computing device is further configured to:
   extract data from the one or more fields of the authorization request messages according to the data selection criteria; and
   form data sets from the extracted data,
   wherein the user inputs are transmitted to the game server via transmission of the data sets.

6. The system of claim 2, wherein the game server requests the user inputs to provide an answer to a question provided in the instructions; and the output identifies a winner who provides the answer correctly in accordance with the instructions using one of the transaction terminals to make a payment transaction.

7. A method for detecting an expected input during a game played across multiple devices, comprising:
   providing a computing device coupled with a communication network connecting separate computers, including:
     a plurality of terminals; and
     a plurality of server computers, wherein the plurality of terminals are configured to generate messages transmitted via the network to the plurality of server computers;
   receiving, in the computing device from a game server, data selection criteria, wherein the game server communicates instructions to devices of users to instruct the users to provide user inputs to the server via a terminal from among the plurality of terminals, wherein the user inputs received via the terminal:
    cause the terminals to generate first messages in the communication network; and
    cause the first messages generated by the terminals to include the user inputs in a way identified in the instructions;

monitoring, by the computing device using the data selection criteria, messages transmitted in the communication network;

detecting, by the computing device using the data selection criteria, the first messages transmitted in the communication network;

extracting, by the computing device in accordance with the data selection criteria, the user inputs from the first messages transmitted in the communication network; and transmitting, by the computing device, the user inputs extracted in accordance with the data selection criteria to the game server, wherein the user inputs cause the game server to:
    generate an output to be displayed via devices of the users based on the user inputs;
    communicate the output to the devices of the users; and
    update the data selection criteria to receive further inputs via the computing device coupled with the communication network.

8. The method of claim 7, wherein the game server is configured to run a game based on the user inputs.

9. The method of claim 8, wherein the terminals are transaction terminals configured to generate payment transactions using payment accounts; and
    the communication network includes an electronic payment processing network configured to transmit payment processing messages for the payment transactions.

10. The method of claim 9, wherein the user inputs are provided via one or more fields in the payment processing messages; and
    the data selection criteria identify the one or more fields.

11. The method of claim 10, wherein the payment processing messages are authorization request messages received in a transaction handler of the electronic payment processing network.

12. The method of claim 10, wherein the data selection criteria identify an expected input; and
    the user inputs transmitted by the computing device to the server includes an identification of a payment processing message that contains the expected input.

13. The method of claim 10, further comprising:
extracting data from the one or more fields of the payment processing messages according to the data selection criteria; and
forming data sets from the extracted data, wherein the user inputs are transmitted to the server via transmission of the data sets.

14. The method of claim 10, wherein the one or more fields include a data field for specifying a transaction amount of a payment transaction.

15. The method of claim 10, wherein the one or more fields include a data field for specifying a date and time of a payment transaction.

16. The method of claim 9, wherein the game requests the user inputs to provide an answer to a question provided in the instructions.

17. The method of claim 16, wherein the output identifies a winner who provides the answer correctly in accordance with the instructions using one of the transaction terminals to make a payment transaction.

18. The method of claim 17, further comprising:
providing, via the electronic payment processing network, a reward to the winner.

19. The method of claim 18, further comprising:
presenting a user interface to invite the users to participate in the game; and
registering the users to store data associating:
    payment accounts of the users based on which accounts the monitoring and detecting are performed; and
    identifications of the user devices to provide the output.

20. A non-transitory computer storage medium storing instructions configured to instruct a computing device to perform a method for detecting an expected input during a came played across multiple devices, the method comprising:
receiving, in the computing device from a came server, data selection criteria, wherein the came server communicates instructions to devices of users to instruct the users to provide user inputs to the server via a terminal from among a plurality of terminals wherein the user inputs received via the terminal:
    cause the terminals to generate first messages in a communication network to which the computing device is attached, the communication network connecting separate computers, including:
        a plurality of terminals; and
        a plurality of server computers, wherein the plurality of terminals are configured to generate first messages transmitted via the communication network to the server computers; and
    cause the first messages generated by the terminals to include the user inputs in a way identified in the instructions;

monitoring, by the computing device using the data selection criteria, messages transmitted in the communication network;

detecting, by the computing device using the data selection criteria, the first messages transmitted in the communication network;

extracting, by the computing device in accordance with the data selection criteria, the user inputs from the first messages transmitted in the communication network; and transmitting, by the computing device, the user inputs extracted in accordance with the data selection criteria to the came server, wherein the user inputs cause the came server to:
    generate an output to be displayed via devices of the users based on the user inputs;
    communicate the output to the devices of the users; and
    update the data selection criteria to receive further inputs via the computing device coupled with the communication network.

\* \* \* \* \*